H. A. HATFIELD.
ENDLESS TRACK.
APPLICATION FILED JUNE 13, 1918.
1,297,844.
Patented Mar. 18, 1919.
2 SHEETS—SHEET 1.
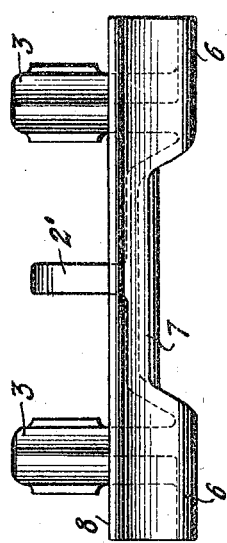
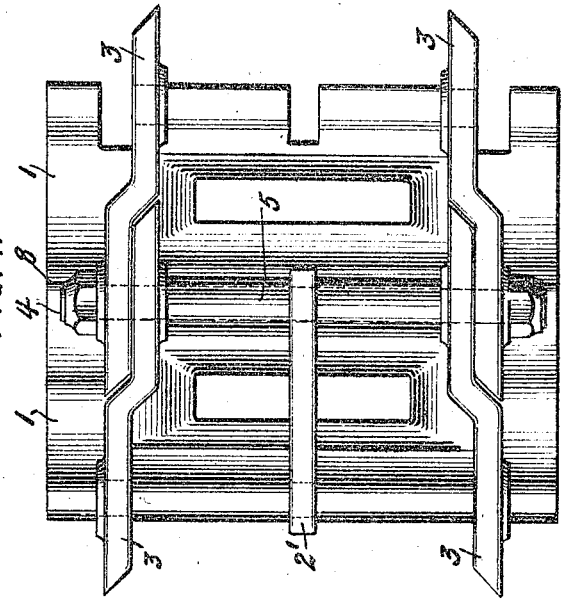
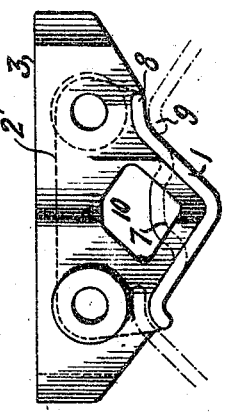
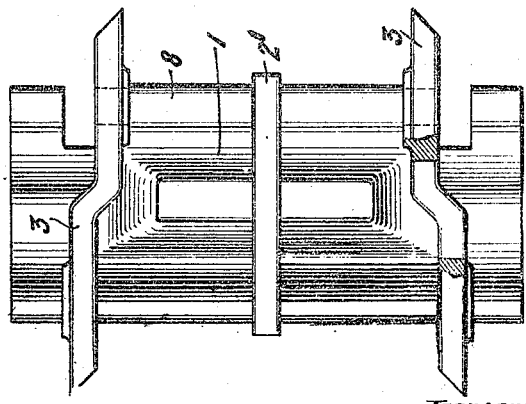
Inventor:
Hurbert Avery Hatfield
By
Atty

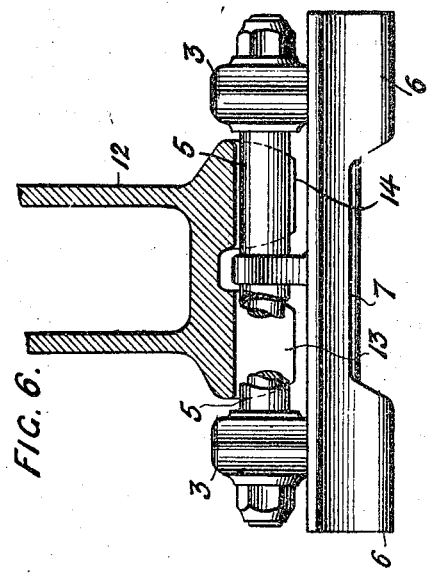
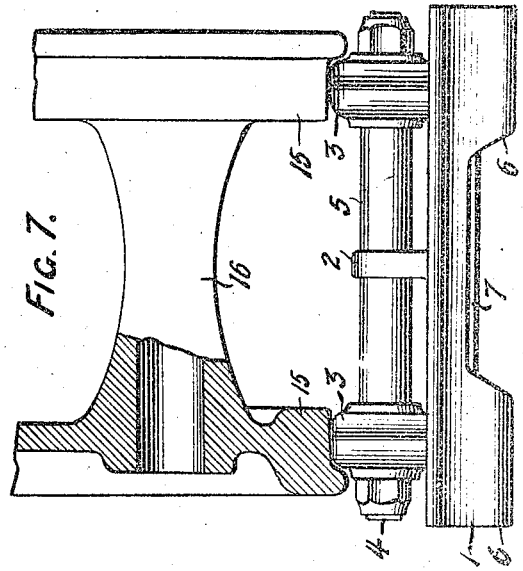
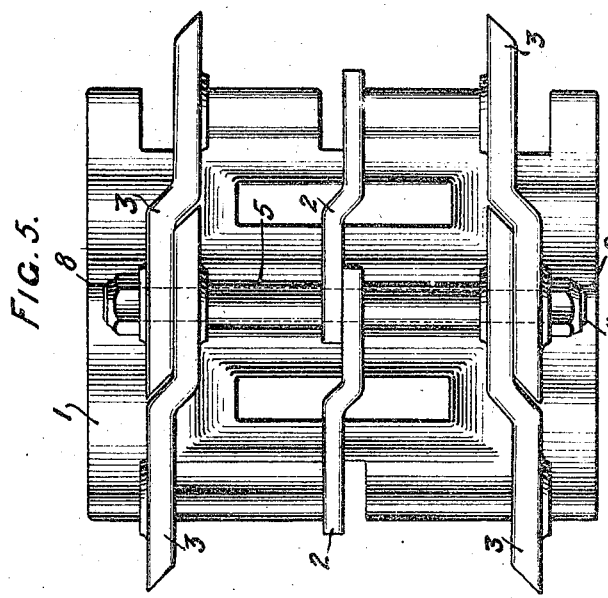
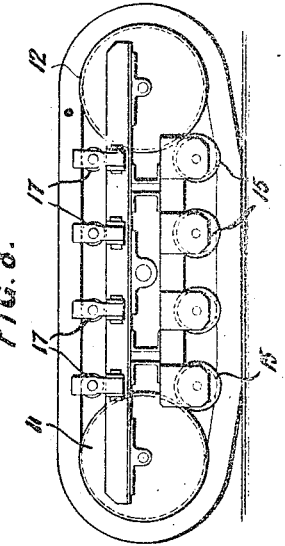

UNITED STATES PATENT OFFICE.

HUBERT AVERY HATFIELD, OF LONDON, ENGLAND, ASSIGNOR TO H. A. H. TRACTORS LIMITED, OF BIRMINGHAM, ENGLAND.

ENDLESS TRACK.

1,297,844.  Specification of Letters Patent.  Patented Mar. 18, 1919.

Application filed June 13, 1918.  Serial No. 239,837.

*To all whom it may concern:*

Be it known that I, HUBERT AVERY HATFIELD, a subject of the King of Great Britain, at present serving with His Majesty's forces in France, and resident of London, England, have invented certain new and useful Improvements in Endless Tracks, of which the following is a specification.

The present invention refers to the construction of the endless tracks for motor-driven vehicles of that type which are wholly or mainly supported upon such endless tracks, and through the medium of which latter the said vehicles receive motion of translation. The tracks as at present constructed consist of a number of links pivoted together, the inner surface of each link having an upstanding lug near each side of said link, the lugs of one link intermeshing with the lugs of the other link, while the links are pivotally connected together by pivot pins passing through the intermeshing lugs, and the tracks are commonly driven by one of the track-carrying wheels being formed with teeth engaging the said pivot pins. In some cases it has been proposed to connect the facing walls of the two upstanding lugs of each link by a tubular boss formed in a piece with the said lugs, through which tubular boss and the two side lugs a pivot pin extends to pivot two adjacent links together, the teeth of the driving track-carrying wheel engaging with the said tubular boss. The present invention refers as aforesaid to improvements relating to such endless tracks all as hereafter described and claimed and from the said following description and claims it will be gathered that the invention presents as characteristic features the fact that in addition to the already known longitudinally-extending upstanding lugs proceeding from the inner face of the links and located near each side of the same, additional central longitudinally-extending upstanding ribs are provided on the links so as to provide three point bearings for the pivot pins which pivot pins pass through the two upstanding side lugs and the central lug of each link, the driving track wheel having teeth each with a central gap to pass astride the central lugs and engage the exposed portions of the pivot pins on each side of the central lug.

Reference will be made to the accompanying drawings which are as follows:—

Figure 1 is a side elevation of a single link of an endless flexible track constructed according to this invention, Fig. 2 being a plan view thereof, and Fig. 3 a right-hand end view. Fig. 4 is a plan view showing two links connected together.

Fig. 5 is a plan view similar to Fig. 4 but showing a slightly modified construction of the links.

Fig. 6 is a sectional end view showing the track and a toothed driving wheel over which the rear end of the track passes and by which it is driven.

Fig. 7 is a sectional end view showing the supporting wheels located between the toothed rear driving wheel and the forward carrying wheel of the track, and Fig. 8 is a diagram showing the general position of the parts.

The flexible track consists of a number of plates jointed one to another by pivot pins, and an example of construction of one of these plates is shown at Figs. 1, 2 and 3 of the accompanying drawings which will now be referred to.

The plate illustrated is formed with a rectangular sole 1 of the requisite dimensions in plan view, and extending centrally and in the direction of the length of the track there is an upstanding rib 2 proceeding from the inner surface of the sole; that is to say from the surface which does not bear upon the road. Upon each side and at a distance from the central rib 2, varying according to the width of the track, is a side upstanding lug 3, each side lug 3 not being in one plane so that the side lugs on the next plate may be brought laterally into conjunction with the side lugs of the first plate as shown at Fig. 4, and the first plate and the second plate there illustrated are then pivoted together by a pivot pin 4 passing through the side lugs 3 of the two adjacent plates and through the central rib 2′ of one of the plates, the second plate shown not having a central rib, and therefore the plates are arranged so that each alternate plate is provided with such a central rib 2′. By these means the pivot pin 4 receives a central support by means of the central rib, as well as a support by means of the side lugs, and between the central rib 2 and the side lugs 3 the pivot pin 4 carries rollers 5. It will be observed that the side lugs 3, when in conjunction as at Fig. 4, form continuous articulated webs one near each side of the track.

The sole 1 of each plate composing the track is formed near each side so as to extend downward as at 6 Fig. 3 below the central part 7 of the sole, and in some cases, although not so shown in the drawings, the extreme ends of the sole may be bent or curved upward; the sides of the sole of each plate at about a line passing transversely and centrally through the plate, extend below the front and rear edges, the ends of the sole sloping upward to the front and rear edges from such central lower part. The rear edge 8 of one plate overlaps the front edge 9 of the next plate, indicated by dotted lines at Fig. 1, considering the length of the track.

The formation of the soles of the plates being as aforesaid such that the tread near the sides thereof extends at intervals downward (considering the lower length of the track), therefore when running on a hard surface the vehicle would be supported upon such downward side extensions 6, but when running on a soft surface such side extensions 6 would sink into the soft earth and bring the central part 7 of the track into contact with such soft surface, thereby giving the track a better grip and support upon the surface over which it is traveling.

The side lugs 3 are formed about centrally with through apertures such as 10 Fig. 1, and also the central ribs 2 are similarly formed with apertures to permit of the escape of earth or other foreign matter from the inner surface of the track.

In some cases a central rib 2 may be formed upon each link as shown at Fig. 5, in such manner that the central ribs, when the links are brought together, laterally overlap each other, and the pivot pin 4 then passes, not only through both the overlapping lugs 3, but also through the overlapping central ribs 2, and with this construction the links of the track are similar to each other and are interchangeable.

As indicated by the outline diagram Fig. 8, such a flexible track is supported and passes over two main carrying wheels, a forward carrying wheel 11 and a rearward carrying wheel 12, the rearward carrying wheel being the wheel by which the track receives motion, and the wheel 12 is driven by any suitable motive power carried on the vehicle.

The main driving wheel 12 is shown in section at Fig. 6 and is formed with two sets of teeth 13, 14, one set of teeth being on each side of the central rib 2 of the track, and the teeth engage the rollers 5 carried by the pivot pins. The teeth of the main driving wheel 12 are constructed in pairs, so that, as the track is passed along, the rollers of each pivot pin are engaged between two teeth of the wheel 12 upon each side of the central rib 2.

The forward main carrying wheel 11 is not illustrated in the drawings but is similar to the driving wheel 12, excepting that the teeth are dispensed with, and the rollers run on the plain surfaces formed on the periphery of the wheel 11, one such plain surface being on each side of the central rib 2.

The shafts of the main carrying wheels 11 and 12 are supported by any suitably constructed frame connected to and supporting the framework or chassis of the vehicle, and the lower length of the track between the main carrying wheels 11 and 12 bears upon the peripheries of supporting wheels 15 carried by the framework of the track, the supporting wheels contacting with the upper edges of the continuous articulated webs formed by the side lugs 3. Such intermediate supporting wheels 15 are shown in the sectional elevation at Fig. 7, and the supporting wheel 15, which bears upon one of the webs formed by the lugs 3 on one side of the track, is held in fixed relation by an elongated hub 16 to the opposite supporting wheel 15 bearing on the other web formed by the articulated lugs 3, both wheels being flanged as shown and thereby lateral strains to which the track is subjected are taken by the flanges of the said supporting wheels 15 and sidewise movement of the track is thereby prevented. The upper length of the track is supported by idle wheels 17 carried in the framework.

The lower length of the track, Fig. 8, is maintained in a straight line by the supporting wheels 15 which have been described, but the diameters of the rear main driving sprocket wheel 12 and the main forward carrying wheel 11 are such, or they are so mounted, that the track after leaving the front main carrying wheel 11 extends at an incline downward to the forward supporting wheel 15, and after leaving the rear supporting wheel 15 the track extends at an angle upward to the main driving sprocket wheel 12, this arrangement facilitating the mounting of the track over obstacles.

What I claim as my invention and desire to secure by Letters Patent is:—

1. A link for endless tracks for motor-driven vehicles comprising a sole plate having a downwardly projecting tread on each side and a relatively elevated intermediate tread.

2. A link for endless tracks for motor-driven vehicles comprising a sole plate having a downwardly projecting V shaped tread on each side thereof and a relatively elevated intermediate tread.

3. In endless tracks for motor-driven vehicles comprising a plurality of links pivoted together, a link having in combination a downwardly projecting tread on each side and an intermediate relatively elevated tread and a longitudinal upstanding rib supporting each of said treads, said tread-supporting ribs of one link being adapted to engage with those of the next link substantially as specified.

4. In endless tracks for motor-driven vehicles comprising a plurality of links pivoted together, a link having in combination a downwardly projecting tread on each side, an intermediate relatively elevated tread, a tread-supporting rib for each tread having transversely alined holes near each end to receive a pivot pin and rollers upon said pivot pin.

5. In endless tracks for motor-driven vehicles comprising a plurality of links pivoted together, a link having in combination a downwardly projecting V shaped tread on each side and a relatively elevated intermediate tread, a longitudinal upstanding rib supporting each of said treads, said tread-supporting ribs having transversely alined holes near each end adapted to receive a pivot pin substantially as and for the purposes specified.

In witness whereof I have hereunto set my hand in the presence of two witnesses.

HUBERT AVERY HATFIELD.

Witnesses:
    NORMAN GRENVILLE NOTLEY,
    ROBERT PARKER LYLE.